Nov. 28, 1967  C. L. TAYLOR ET AL  3,354,625
AUTOMATIC PRESSURE DOOR CONTROL FOR COTTON PICKERS
Filed April 9, 1964  3 Sheets-Sheet 1
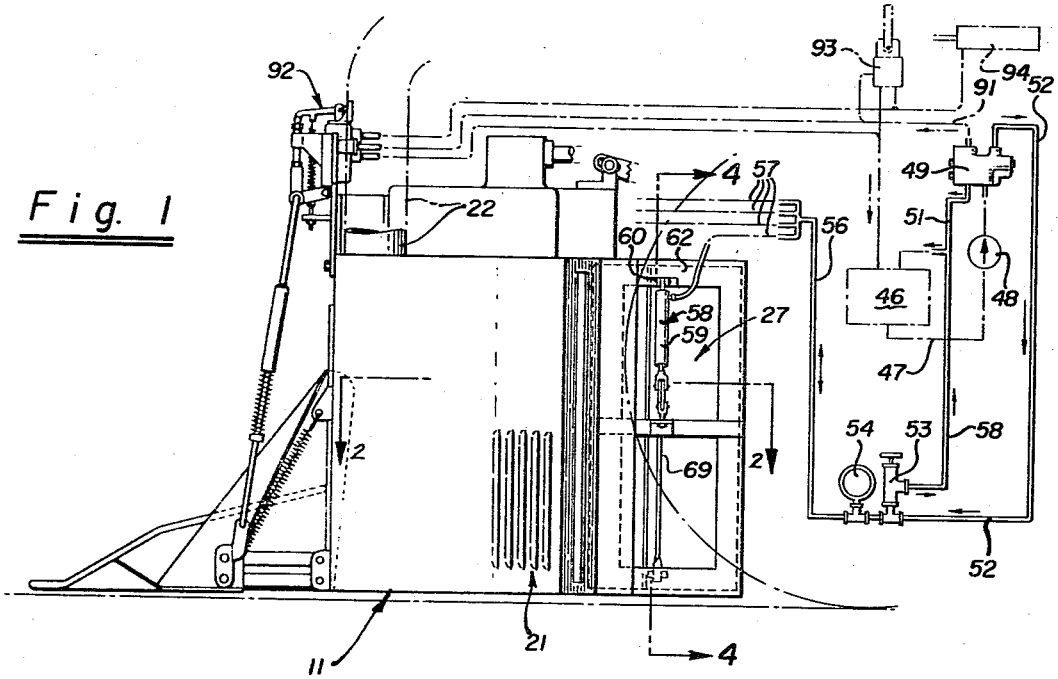
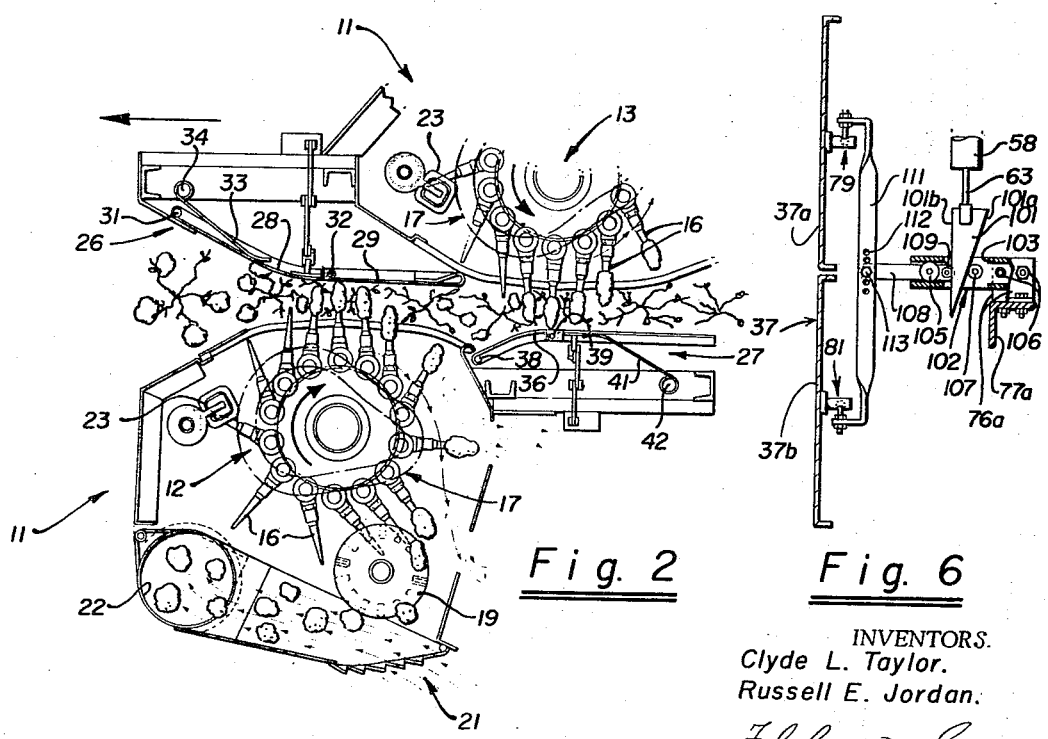
INVENTORS.
Clyde L. Taylor.
Russell E. Jordan.
Attorneys INVENTORS.
Clyde L. Taylor.
Russell E. Jordan.

Attorneys

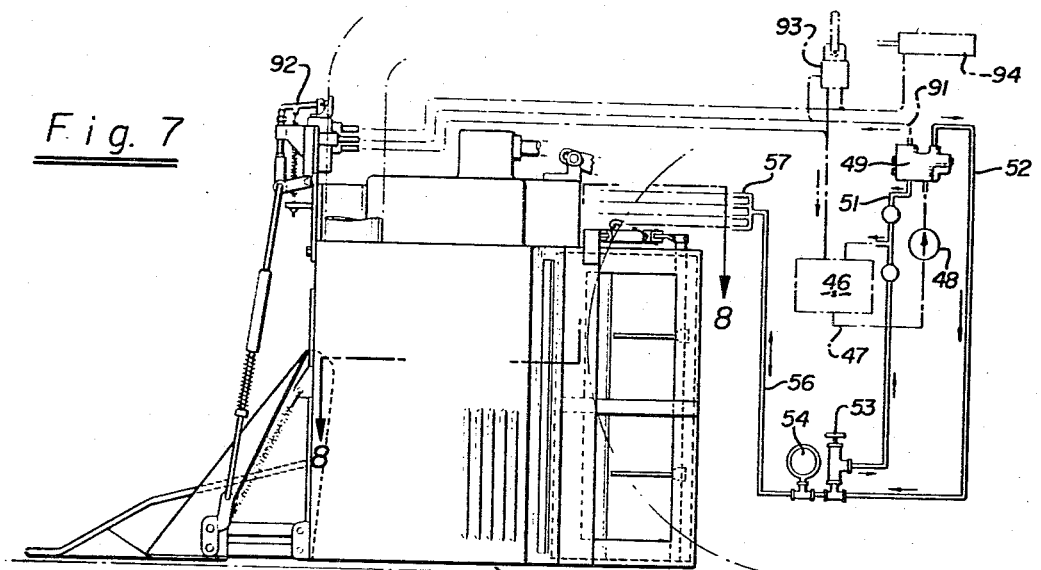
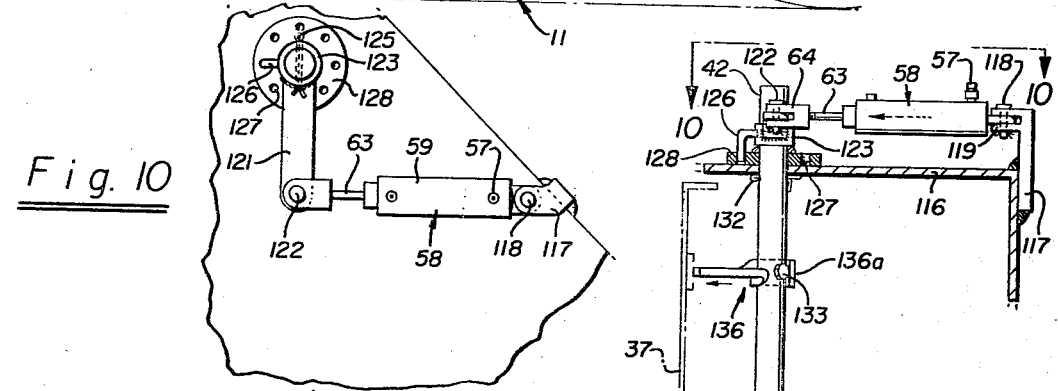

United States Patent Office 3,354,625
Patented Nov. 28, 1967

3,354,625
AUTOMATIC PRESSURE DOOR CONTROL
FOR COTTON PICKERS
Clyde L. Taylor, 1545 S. Chinowth Road, Visalia, Calif. 93277, and Russell E. Jordan, 285 W. I St., Brawley, Calif. 92227
Filed Apr. 9, 1964, Ser. No. 358,599
40 Claims. (Cl. 56—44)

This application is a continuation-in-part of our earlier filed copending application Ser. No. 166,246, filed Jan. 15, 1962 and now abandoned.

This invention relates to cotton pickers and more particularly to cotton pickers with automatic pressure door control.

At the present time, cotton pickers are provided with pressure doors, sheets or plates which are only spring-loaded. These doors or pressure sheets hold the cotton bolls in the path of the spindles for maximum picking efficiency. The force applied by the spring-loaded doors can be manually adjusted by dismounting from the cotton picker. It can be seen that when travelling through a field after the doors have once been adjusted, a force is applied to the plants to urge the bolls into the path of the spindles. However, this has been found to be unsatisfactory because the cotton plants are not uniform. In particular, the cotton plants vary in height as, for example, from 3 ft. to 6 ft. Also, the plants can vary greatly in bushiness and overall width. In order to keep from pulling green bolls off the cotton plant, it is necessary to keep the spring-loaded doors relatively loose. Thus, the cotton picker may do a relatively good job in tall, heavy cotton but the moment the cotton gets shorter which may happen from one end of the field to the other, there is little or no pressure against the plant and the cotton picker will not pick well. There is, therefore, a need for a new and improved pressure door for use with cotton pickers.

In general, it is an object of the present invention to provide a cotton picker with automatic pressure door control.

Another object of the invention is to provide an automatic pressure door control of the above character in which the pressure applied by the door can be automatically maintained at a predetermined pressure.

Another object of the invention is to provide an automatic pressure door control of the above character which can be very accurately controlled.

Another object of the invention is to provide an automatic pressure door control of the above character which can be readily mounted on cotton pickers already in use.

Another object of the invention is to provide an automatic pressure door control of the above character which can be readily installed and maintained.

Another object of the invention is to provide an automatic pressure door control which can be utilized with horizontally split and vertically split doors.

Another object of the invention is to provide an automatic pressure door control of the above character which can be rapidly and easily installed on cotton pickers already assembled with only very minor modifications to the cotton picker.

Another object of the invention is to provide an automatic pressure door control of the above character in which the use of springs is eliminated.

Additional objects and features of the invention will appear from the following description in which the preferred embodiments are set forth in detail in conjunction with the accompanying drawings.

Referring to the drawings:

FIGURE 1 is a side elevational view of a portion of a cotton picker incorporating our automatic pressure door control showing some of the parts in schematic form.

FIGURE 2 is an enlarged cross-sectional view taken along the line 2—2 of FIGURE 1 showing the operation of the pressure doors in holding the bolls in the path of the spindles.

FIGURE 6 is a side elevational view of another embodiment of our automatic pressure door control.

FIGURE 7 is a side elevational view of a portion of a cotton picker incorporating another embodiment of our automatic pressure control and showing some of the parts in schematic form.

FIGURE 8 is an enlarged cross-sectional view taken along the line 8—8 of FIGURE 7 showing the construction and the mode of operation of the automatic pressure door control shown in FIGURE 7.

FIGURE 9 is an enlarged cross-sectional view of the automatic pressure door control shown in FIGURE 7.

FIGURE 10 is an enlarged plan view looking along the line 10—10 of a portion of our automatic pressure door control.

Figure 3:
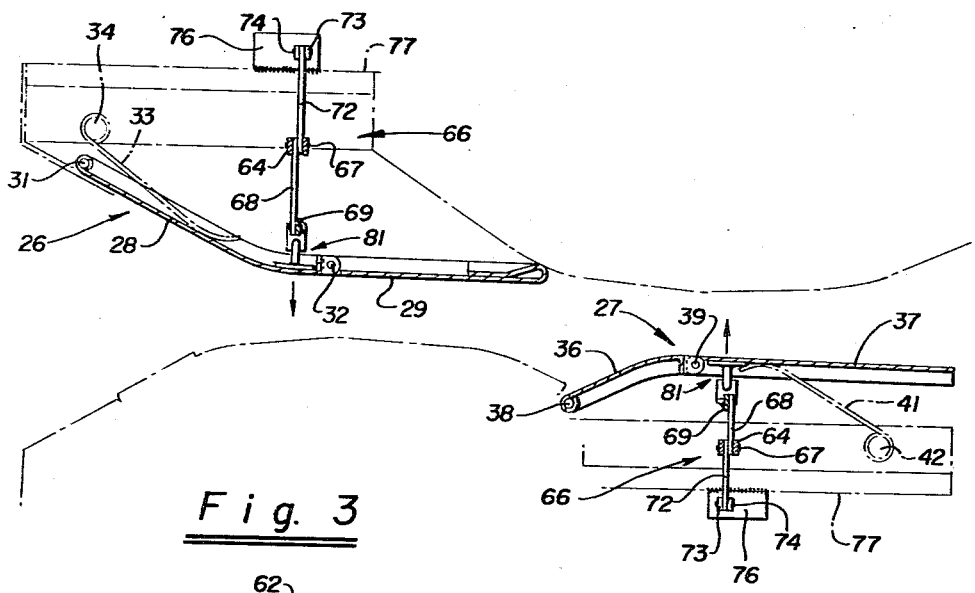
FIGURE 3 is an enlarged detailed view of the pressure doors shown in FIGURE 2.

In general, our automatic pressure door control for cotton pickers consists of a picker drum and a plurality of moving spindles carried within the drum. A pressure door is mounted in the drum. Means is provided for yieldably urging the pressure door into engagement with the plant to thereby urge the plant into the moving spindles with a predetermined substantially uniform pressure regardless of plant size.

As shown in the drawings, the conventional cotton picker includes one or more picker drums 11 depending upon whether or not the cotton picker is a single row or a two row cotton picker. Normally, one picker drum is provided for each row of cotton to be picked. The picker drums 11 are normally mounted on a wheeled vehicle (not shown) as disclosed in Patent No. 2,700,857 for moving the picker drum over the cotton plants for removing the cotton bolls from the plants. The picker mechanism is mounted on the vehicle for vertical movement with respect to the vehicle so that it can be placed in optimum picking position with respect to the cotton plants and the ground being traversed by the cotton picker.

The picker drums 11 can take any one of a number of forms. One type of picker drum is the picker drum manufactured by International Harvester. Each drum is provided with a pair of rotors 12 and 13 which are driven in the direction indicated by a mechanism which is not shown. Each of the rotors carries a plurality of vertically spaced rows of spindles 16 which travel endless paths. Each of the rotors is provided with cam means 17 which moves the spindles straight into the plants and then pulls them straight out. At the same time that the spindles are being extended and retracted, the spindles are being rotated so that the cotton bolls are removed from the cotton plants. Thereafter, the cotton bolls are removed by rotating vertically spaced doffers 19 and the cotton bolls are drawn into an air stream coming in through a louvered air intake 21 in the drum and passing into a pipe 22. The air stream carries the picked cotton into the basket mounted on the cotton picker. After the cotton bolls have been removed from the spindles, the spindles are cleaned by rotating cleaning pads 23.

A pressure door assembly 26 is provided for the rotor 12 and a pressure door assembly 27 is provided for the rotor 13. The pressure door assembly 26 consists of a pair of doors 28 and 29 in which the door 28 is pivotally mounted in the picker mechanism at 31 for movement about a vertical axis. The door 29 is pivotally mounted at 32 on the door 28 for movement about a vertical axis. A plurality of springs 33 are mounted on a shaft 34 and yieldably engage the door 28 to yieldably urge the door toward the spindles of the rotor 12 as shown particularly in FIGURE 2 of the drawings. The rotational position of the shaft 34 cam be adjusted by means (not shown) to adjust the pressure applied by the door to the cotton plants.

The pressure door assembly 27 is very similar to the pressure door assembly 26 and consists of doors 36 and 37. The door 36 is pivotally mounted in the picker drum at 38 for movement about avertical axis. The door 37 is pivotally mounted on the door 36 at 39 to permit movement of the door 37 relative to the door 36 about a vertical axis. A plurality of springs 41 are mounted on a shaft 42 and engage the door 37 and serve to yieldably urge the door towards the spindles 16 of the rotor 13. The rotational position of the shaft 42 can be adjusted in the same manner as shaft 34 and for the same purpose.

The portions of the cotton picker thus far described are conventional and form a part of the International Harvester cotton picker.

Means is provided for yieldably urging the pressure door assemblies toward the rotor to urge the cotton plants into the rotor with a predetermined substantially uniform pressure regardless of plant size. Such means consists of a fluid or hydraulic control system which includes a fluid reservoir or sump 46 which is connected by a pipe 47 to a pump 48. The output of the pump 48 is connected to a flow divider 49 of a suitable type such as the model CFD-50 flow divider manufactured by Gresen Manufacturing Company of Minneapolis, Minnesota. The flow divider 49 is connected to the tank or sump 46 by a pipe 51. The flow divider is of a type which divides one flow of oil into two separate flows, one a constant flow regardless of input pressure and the other a flow in excess of the constant flow. The constant flow port of the flow divider 49 is connected to a pipe 52. The pipe 52 is connected to an adjustable pressure relief valve 53 which can be utilized for adjusting the pressure in the hydraulic line connected to it through a suitable range such as from 20 p.s.i. to 200 p.s.i. The other end of the adjustable relief valve 53 is connected to a gauge 54 of a conventional type which can be utilized for visually determining the pressure being applied through the relief valve 53.

The gauge 54 is connected to a pipe 56 which is connected to a plurality of pipes 57. The number of pipes 57 required is determined by the number of pressure door assemblies which are provided on the cotton picker. For example, in a two row cotton picker, four pipes 57 are required with two pipes leading to each of the drums. As shown particularly in FIGURE 1, each of the pipes 57 is connected to a hydraulic actuator 58. The cylinder 59 of the actuator has its upper end connected by pin 60 to a pair of ears 61 which are affixed to one of the frame members 62 that forms a part of the picker drum. The hydraulic actuator 58 is provided with a piston 63 to which is fixed a clevis 64.

The clevis 64 is pivotally connected to the knee of a toggle assembly 66 by a pin 67. The toggle assembly 66 consists of a link 68 which has one end pivotally connected to an equalizer bar 69 by pin 71. The other end is pivotally connected to the clevis 64 and another link 72 by the pin 67. The other end of the link 72 is pivotally connected to an upstanding connector 73 by pin 74. The connector 73 is threaded into an angle member 76 which is fixed to a cross member 77 that forms a part of the frame of the picker drum 11.

The equalizer bar 69 extends vertically and has its upper and lower ends fixed to ball and socket assemblies 79 and 81. As is shown in the drawings, the ball members of the assemblies are secured to the ends of the equalizer bar 69, whereas the socket members are fixed to the door 37.

In this same manner, each of the pressure door assemblies is provided with a hydraulic actuator 58 which is connected to one of the lines 57.

The excess flow port from the flow divider 49 is connected to a pipe 91. This pipe 91 is connected to automatic positioning means as described in Patent No. 2,972,847. The automatic positioning means, as disclosed in that patent, includes a control valve 92, a selector valve 93 and a hydraulic ram 94. The hydraulic ram is used for raising and lowering the picker drum.

Operation and use of the means for yieldably urging the pressure doors into engagement with the plant with a predetermined substantially uniform pressure regardless of plant size may now be briefly described as follows: Let it be assumed that the operator of the cotton picking machine has adjusted the relief valve 53 to provide the desired amount of fluid pressure as, for example, 50 p.s.i., to the hydraulic actuators 58. The valve 53 is normally positioned so that it is readily accessible to the driver from the driver's seat and can be operated while the cotton picker is moving. The gauge 54 is also positioned so that it is readily visible to the driver while he is in the driver's seat and adjusting the valve 53. Hydraulic fluid is applied through the pipes 57 to the actuators 58 so that the pistons 63 are moved downwardly to urge the toggles 66 downwardly to thereby apply a force in a horizontal direction to the equalizer bars 69 until a predetermined force is applied to the pressure doors. Thereafter, the excess fluid is bypassed to the sump 46 by the pressure relief valve 53.

It will be noted that the links 68 are connected to the equalizer bars 69 in such a manner that equal forces are applied to the top and bottom portions of the door to thereby ensure that equal pressures are applied to the plant by the top and bottom portions of he door. The springs 33 and 41 engaging the doors will apply a slight amount of pressure inwardly on the doors. However, as pointed out previously, this spring pressure can be readily adjusted so that it does not exceed a predetermined amount.

Now let it be assumed that a big plant, i.e., larger than normal, comes into the passage in the picker drum. As this occurs, the pressure doors will be urged outwardly away from the spindles to permit the plant to pass through. This will occur because the doors will apply a greater pressure to the hydraulic cylinders and cause oil in the line 56 to be backed up through the pressure relief valve 53 into the line 58 and into the sump tank 46. As soon as the cotton picker moves into a smaller plant or plants, the pressure on the doors will begin to lessen and will decrease the pressure in the actuator 58 so that additional fluid is applied to the line 56 through the pressure relief valve 53 to urge the plants inwardly toward the spindles so that the bolls on the plants will be removed by the spindles.

The same type of action will occur with all of the doors because all of the doors are controlled by the same fluid pressure. The doors can act independently of one another but always apply a constant pressure to the plants as determined by adjustment of valve 53 to urge the plants uniformly into the spindles 16. This ensures that all of the plants will be properly picked whether they are large or small.

The arrangement which we have devised for providing this constant pressure on the pressure doors is relatively simple. By the use of the flow divider 49, it is unnecessary to provide a separate hydraulic system. The hydraulic system which is utilized for operating the other parts of the cotton picker such as the automatic positioning means described in Patent No. 2,972,847 can be readily accomplished by the fluid flow which passes from the excess fluid port of the flow divider 49.

Figure 4:
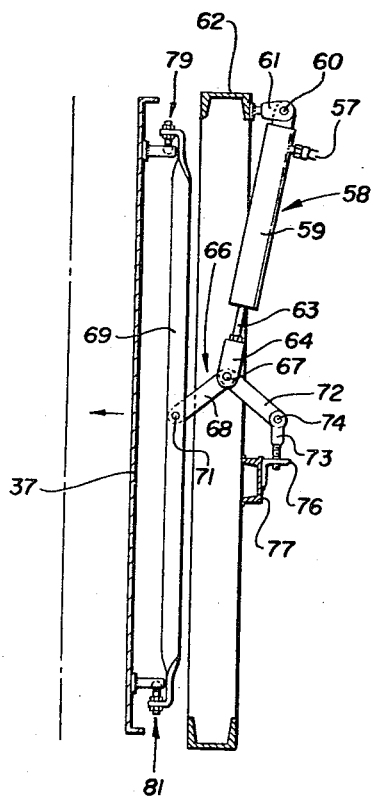
FIGURE 4 is a cross-sectional view taken along the line 4—4 of FIGURE 1.
Figure 5:
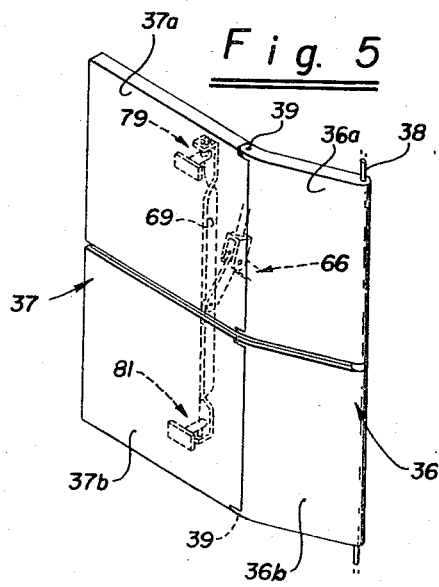
FIGURE 5 is a perspective view showing the mounting of our automatic pressure door control on horizontally split doors.

Another embodiment of our invention is shown in FIGURE 5 and shows pressure doors which are split horizontally as well as vertically. Thus, in the embodiment shown in the drawing, the door 36 is split into two parts, 36a and 36b, and the door 37 is split into two parts, 37a and 37b. The hydraulic piston 63 is connected to the doors by a toggle assembly 66 which is connected to an equalizer bar 69 in the same manner as shown in FIGURE 4. The ends of the equalizer bar 69 are connected to the upper and lower parts or sections 37a and 37b in the same manner in which the equalizer bar 69 is connected to the door 37 in FIGURE 4.

Operation of the pressure plates or the pressure doors shown in FIGURE 5 may now be briefly described as follows. Let it be asumed that a predetermined pressure is applied to the doors 36 and 37 by the hydraulic cylinder 58 in a manner similar to that described for the previous embodiment. When this is the case, even or equal pressure will be applied to both the upper and lower sections 37a and 37b of the door 37. Thus, if the foliage is heavier closer to the ground, the lower section of the door or plate can open wider independent of movement of the top section of the door because of the pivotal connection to the equalizer bar 69. This ensures that all portions of the plant will be urged into the picking spindles 16 by uniform or even pressure. In this way, it is possible to obtain very uniform picking with a substantial reduction in ground losses. Because of the hydraulic system utilized, a constant yieldable pressure will always be applied to the doors so that the plants are urged with a uniform pressure into the path of the spindles.

In many instances, it may be desirable to apply more pressure on the rear doors than on the forward doors because after the cotton plants have passed the front doors, the cotton bolls have been stripped from one side of the plants and there is less mass to the plant. For that reason, it is often desirable to apply additional pressure to the rear doors so that the cotton plants are forced into the rear rotor 13 with greater force to thereby facilitate better stripping of the cotton bolls from the plant. This applicaion of greater pressure to the rear door can be accomplished in a number of ways.

The same pressure is applied to the hydraulic actuators 58 for the front and rear doors. A differential in force applied to the cotton plants by the front and rear doors can be obtained by shifting fowardly the ball and socket assemblies 79 and 81 which are affixed to the door 28. This can be readily accomplished by providing a plurality of holes (not shown) in the door 28 and utilizing bolts (not shown) for connecting the ball and socket assemblies 79 and 81 to the door and thereafter shifting the point of attachment of the ball and socket assemblies 79 and 81 to the door to the desired position. Shifting of this point of attachment forward will decrease the lever arm for the door so that even though the same force is applied by the hydraulic actuator to the toggle mechanism 66, the door 28 and the associated door 29 will be pushed in with a lesser force than the rear doors 36 and 37 to thereby obtain the desired effect. It is then merely necessary to increase the pressure applied by the hydraulic actuators to obtain the desired force on the rear doors. Therefore, with such an arrangement, it can be seen that it is possible to apply greater pressure to the cotton plants as they are engaged by the rear doors than the pressure which is applied to the cotton plants by the front doors even though the hydraulic actuators associated with the front and rear doors are applying the same force.

With the toggle mechanism shown in the previous embodiment, the pressure applied by the toggle mechanism to the equalizer bar 69 is not completely uniform even though a uniform force may be applied by the hydraulic actuators 58. This is because, as is well known to any one skilled in the art, that as the toggle mechanism approaches the straight line position, the greater force that will be applied by the toggle mechanism to the equalizer bar 69 even though a uniform force is being applied by the hydraulic actuator 58. Conversely, the farther the toggle mechanism is from the straight line position, the less force applied to the equalizer bar 69 by the hydraulic actuator 58. Where such difference in force applied to the doors is objectionable, a mechanism such as that shown in FIGURE 6 can be utilized.

Also, with horizontally split doors, at times it may be desirable to apply more pressure to the bottom door than to the top door. This is because the portion of the cotton plant engaged by the bottom door may be bushier or fuller so that it is desirable to apply greater pressure to this portion of the cotton plant so that it is urged into the spindles to ensure proper picking. The embodiment shown in FIGURE 6 is also provided with means to accomplish this purpose.

As shown in FIGURE 6, our automatic pressure door control consists of a hydraulic actuator 58 identical to that hereinbefore described which is connected to a fluid system of the type shown in FIGURE 1. It also consists of a spade-like cam member 101 which is substantialy triangular in shape. The spade-like cam member 101 extends through slots 103 provided in a cylindrical sleeve 102. Sleeve 102 is solidly mounted on the angles 76a at 106. The angles in turn are bolted to crossframe member 77a at 104. Within the sleeve 102 is mounted a roller 107 which is adapted to engage a face 101a of the spade-like cam member 101. Another push rod 108 is slidably mounted within the other end of the sleeve 102 and is provided with a roller 109 which is adapted to engage a face 101b provided on the spade-like cam member 101. A second roller 105 is mounted on rod 108 near roller 109 and guides push rod 108 within sleeve 102. The other end of the push rod 108 is pivotally connected to an equalizer bar 111 which is provided with a plurality of vertically spaced holes 112 extending longitudinally of the bar 111. A bolt 113 extends through the push rod 108 and one of the holes 112 in the equalizer bar 111. The equalizer bar 111 is connected by ball and socket assemblies 79 and 81 to the upper and lower door sections 37a and 37b.

The arrangement shown in FIGURE 6 has the distinct advantage in that a substantially uniform force will always be applied to the equalizer bar 111 by the push rod 108 independent of the angular position of the push rod 108. This is because of the constant slope provided by the surface 101b so that as a constant force is supplied by the hydraulic actuator 58, a constant force also will be supplied to the push rod 108 and to the equalizer bar 111. Thus, as the spade-like cam member 101 is raised and lowered by the hydraulic actuator 58, a constant force is always applied by the push bar 108 to the pressure door.

The relative force applied to the upper and lower doors 37a and 37b can be changed by shifting the point of attachment of the push rod 108 to the equalizer bar. Thus, if it is desired to apply greater pressure to the lower door than to the upper door, it is merely necessary to shift the point of connection of the push bar 108 downwardly on the equalizer bar 111 by removing the bolt and then inserting the bolt in a lower hole 112 after the push bar 108 has been shifted to the desired position. As explained above, with a greater force applied to the lower door, it is possible to urge the lower portion of the plant into the rotor of the cotton picker with a greater force to ensure the best possible picking operation.

Still another embodiment of our automatic pressure door control for cotton pickers is shown in FIGURES 7–10. As can be seen from the drawings, many parts of this embodiment are similar to parts in the embodiments hereinbefore described. In this embodiment, the hydraulic actuator 58 is mounted upon the housing 116 which forms a part of the drum in a position which is on top of the drum as shown particularly in FIGURE 9. The hydraulic actuator 58 can be mounted in any suitable manner. For example, as shown in the drawings, the cylinder 59 can be pivotally connected to a bracket 117 by a pin 118 which extends through a pair of ears 119 formed on the bracket. The bracket 117 can be secured to the housing 116 in a suitable manner as, for example, by welding, as shown. The clevis 64 of the plunger 63 of the hydraulic actuator 58 is pivotally connected to a lever arm 121 by suitable means such as a pin 122. The lever arm 121 is fixed to a collar 123 by suitable means such as welding. The collar 123 is rotatably mounted upon the shaft 42 and is provided with a depending lug 126. The collar 123 is held on the shaft 42 by a cotter pin 125. The lug 126 is adapted to engage holes 127 spaced circumferentially around a circular plate 128 which is also mounted on the shaft 42 and is affixed thereto by suitable means such as welding, as shown. The collar 123 is adapted to be lifted so that the depending lug 126 clears the holes 127 to thereby permit the lug 126 to be positioned in any one of the holes 127 provided in the plate 128 for adjustment of the control as hereinafter described.

The shaft 42 is provided in conventional cotton pickers and has its lower extremity rotatably mounted in a lower bearing 131. The upper portion of the shaft 42 passes through the housing 116 and is retained in the bearing 131 by a cotter pin 132 which engages the housing 116 as shown in FIGURE 9. Conventionally, this shaft 42 is provided with a plurality of springs 41 which are spaced vertically of the shaft and which are secured thereto by cap screws 133. In this embodiment of our automatic pressure door control for cotton pickers, we have found that it is desirable to make these springs 41 ineffective. This can be accomplished by not placing the springs 41 on the shaft 42 when building new cotton pickers, or in the case of cotton pickers already in the field, by removing the cap screws 133 and permitting the springs 133 to drop on the shaft. This makes it unnecessary to remove the shaft 42 from the housing and, therefore, simplifies the installation of our control.

As soon as the springs 41 have been dropped, shoes 136 are mounted upon the shaft 42. The shoes are formed so that they are adapted to engage at least one of the doors of the pressure door assembly. Thus, as shown in detail in the drawings, the shoes engage the forward door 28 of the pressure door assembly 26 and the rear door 37 of the door assembly 27. The shoes 136 can be secured to the shaft 42 in any suitable manner. However, we have found it desirable to form the shoes 136 in such a manner that they can be secured to the shaft without removal of the shaft from the drum housing 116. Thus, as shown, the shoes 136 are provided with a semicircular portion 136a which is adapted to accommodate the shaft 42 and which is secured to the shaft 42 by one of the bolts 133. Each of the shoes 136 is also formed with a straight portion 136b, an inclined portion 136c and a curved portion 136d. The curved portion 136d is adapted to engage a wear plate 138 provided on the door.

It will be noted in the embodiment as shown in FIGURE 9 that only two shoes 136 have been provided on the shaft 42, one on the upper portion of the shaft, and one on the lower portion of the shaft. It is readily apparent that, if desired, only one shoe can be utilized for this purpose or additional shoes can be provided. However, it is believed preferable that at least two shoes be provided to minimize the stress placed on the door assembly. At least two shoes are necessary if the door assemblies are split horizontally as in the embodiments hereinbefore described with one shoe 136 engaging the upper part and the other shoe engaging the lower part.

Operation of this embodiment of our automatic pressure door control is quite similar to that hereinbefore described. Hydraulic fluid under a constant pressure is supplied through the line 57 to the hydraulic actuator 58 which urges the plunger 63 outwardly to apply rotational forces to the shaft 42 in a clockwise direction, as viewed in FIGURE 10, to cause a substantially uniform pressure to be applied by the shoes 136 to the pressure door 37. Thus, as hereinbefore described, when a larger plant passes into the picker drum, the doors will be urged outwardly because of the greater pressure applied by the plant. Conversely, when a smaller plant passes into the picker drum, the doors will be urged inwardly by the actuators 58. Thus, it can be seen that the hydraulic actuators 58 will cause a substantially uniform pressure to be applied to the plants by the doors regardless of the size of the plants. As hereinbefore explained, when the hydraulic actuators 58 are all interconnected, the doors all apply a constant pressure to the plants as determined by the adjustment of the valve 53 but each can act independently of the other to thereby ensure that all the plants will be properly picked, either large or small.

When it is desired to change the range of adjustment of the shoes 136, it is merely necessary to lift the collar 123 upwardly to clear so that the depending lug 126 clears the hole 127 in which it is positioned. Then the collar 123 is rotated until the desired hole 127 is reached, and the collar dropped so that the lug 126 again engages one of the holes 127. With this adjustment means, it can be seen that a greater range of adjustment can be obtained so that very small plants and very large plants can be picked with the cotton picker, while at the same time still applying constant pressure to the plants to urge the same into the spindles of the cotton picker to ensure uniform picking.

Although we have shown the pressure door assemblies 26 and 27 as only being split vertically, the door assemblies can also be split horizontally as shown in the embodiments hereinbefore described in FIGURES 5 and 6. In such a case, the lower shoe 136 would engage the lower door section and the upper shoe 136 would engage the upper door section. If desired, it is readily apparent that an additional shaft can be placed in the drum and a separate hydraulic actuator 58 provided for driving the same so that a separate actuator 58 is provided for each of the upper and lower door sections and so that each section can be used to urge the portion of the plant engaged thereby into the spindles at a constant pressure independent of the other.

From the foregoing, it can be seen that the embodiment shown in FIGURES 7, 8, 9 and 10 is one which can be very readily installed on the cotton picker with very minor changes to the cotton picker and with very little effort.

It is apparent from the foregoing that we have provided a new and improved automatic pressure door control for cotton pickers which makes it possible to yieldably urge the pressure doors into engagement with the plant into the picking spindles with a predetermined substantially uniform pressure regardless of plant size. The control apparatus is constructed in such a manner that it can be applied to existing cotton pickers as well as incorporated in new cotton pickers as they are manufactured. The pressure door control can be readily installed and can be readily operated by the operator of the cotton picker while the cotton picker is in operation.

We claim:

1. In an automatic pressure door control for cotton pickers, a picker drum movable over the cotton plants, a plurality of moving spindles carried within the drum, a pressure door mounted in said drum movable toward and away from the spindles and adapted to engage the cotton plants as the plants move into the drum to urge the bolls on the cotton plants into the path of the moving spindles, and automatically operated means for yieldably and continuously urging said pressure door into engagement with the cotton plants to urge the cotton plants into the moving spindles with a predetermined substantially uniform pressure regardless of plant size as the picker drum moves over the cotton plants.

2. In an automatic pressure door control for cotton pickers, a picker drum movable over the cotton plants, a plurality of moving spindles traveling in an endless path within said drum, a pressure door mounted in said drum for movement about a vertical axis towards and away from said spindles, and automatically urging means for yieldably and continuously urging said pressure door into engagement with the plants so as to urge the plants towards the spindles with a predetermined substantially uniform pressure regardless of plant size as the picker drum is moved over the cotton plants.

3. An automatic pressure door control as in claim 2 wherein the door is split horizontally to provide top and bottom door sections and wherein the means for yieldably urging the pressure door into engagement with the plants includes an equalizer bar connected to the door sections which urges both sections of the door into engagement with the plant.

4. In an automatic pressure door control for cotton pickers, a picker drum, the picker drum having a passage therethrough through which the cotton plants can pass, a plurality of rotating spindles moving in an endless path and disposed on opposite sides of the passage to engage opposite sides of the plants passing through the passage, a pressure door assembly mounted in the drum on each side of the passage and associated with the rotating spindles, the pressure door assembly comprising a pair of doors, one of the doors being pivotally mounted on the frame for movement about a vertical axis and the other of the doors being mounted on the first named door for pivotal movement about a vertical axis, and means coupled to each of the door assemblies for yieldably urging the pressure doors into engagement with the cotton plants as they pass into the drum to urge the plants with a substantially uniform pressure into the moving spindles regardless of plant size, said last named means including a source of fluid, a pump connected to the source of fluid, a fluid actuator coupled to each of the door assemblies, and means connecting the output of the pump to the fluid actuator, said means connecting the output of the pump to the fluid actuator including means for adjusting the pressure of fluid applied to the fluid actuators.

5. An automatic pressure door control as in claim 4 wherein said means connecting the output of the pump to the hydraulic actuator also includes a flow divider.

6. An automatic pressure door control as in claim 5 wherein said doors are split horizontally to provide upper and lower door sections and wherein said means for yieldably urging the pressure doors into engagement with the plants includes means coupled to each of the door sections so that the door sections are urged into engagement with the plant with a predetermined substantially uniform pressure.

7. An automatic pressure door control as in claim 2 wherein said door is split horizontally to provide upper and lower door sections and wherein said means for yieldably urging said pressure door into engagement with the plants includes means for applying a predetermined differential pressure to one of the door sections with respect to the other door section.

8. In an automatic pressure door control for cotton pickers, a picker drum, a plurality of moving spindles carried within the drum, a pressure door mounted in said drum and adapted to engage the cotton bolls as the plants move into the drum to urge the bolls on the cotton plants into the path of the moving spindles, and means for yieldably urging said pressure door into engagement with the cotton plants to urge the cotton plants into the moving spindle with a predetermined substantially uniform pressure regardless of plant size, said means for yieldably urging the pressure door including a source of hydraulic fluid, a pump connected to said source of hydraulic fluid, a flow divider connected to said pump, and a hydraulic actuator coupled to said pressure door and piping connecting the flow divider to the hydraulic actuator.

9. An automatic pressure door control as in claim 8 together with means for adjusting the pressure applied to the hydraulic actuator.

10. In an automatic pressure door control for cotton pickers, a picker drum, a plurality of moving spindles travelling in an endless path within said drum, a pressure door mounted on said drum for movement about a vertical axis, said pressure door being split horizontally to provide top and bottom door sections, and means connected to said door sections for yieldably urging the door sections into engagement with the plants so as to urge substantially all portions of the plants towards the spindles with a predetermined substantially uniform pressure regardless of plant size, said last named means including a substantially vertical equalizer bar having its upper and lower ends connected to the top and bottom door sections, a hydraulic actuator, means connecting the hydraulic actuator to the equalizer bar so that as the hydraulic actuator is operated, the equalizer bar is moved outwardly to urge the top and bottom door sections into engagement with the plants, and means for applying fluid to the hydraulic actuator.

11. An automatic pressure door control as in claim 10 wherein said means for supplying fluid to the hydraulic actuator includes a source of hydraulic fluid, a pump connected to the source of hydraulic fluid, a flow divider connected to the output of the pump, means connecting the output of the flow divider to the hydraulic actuator, said last named means including an adjustable relief valve for adjusting the pressure to be applied to the hydraulic actuator, and return means connected to the flow divider and to the source of hydraulic fluid to provide a return path for the hydraulic fluid from the adjustable relief valve and from the flow divider.

12. In a cotton picker, a picker drum, a plurality of moving spindles travelling in an endless path within said drum, a pressure door mounted in said drum for movement about a vertical axis, means for yialdably urging said pressure door into engagement with the plants so as to urge the plants towards the spindles with a predetermined substantially uniform pressure regardless of plant size as the cotton picker moves over the plants, said means for yieldably urging the pressure door into engagement with the plants including a push member connected to the door, a hydraulic actuator, and a cam member connected to the actuator and engaging the push member serving to apply a constant force to the push member when a constant pressure is applied to the actuator which is independent of the position of the cam member relative to the actuator.

13. In an automatic pressure door control for cotton pickers, a picker drum, a plurality of moving spindles travelling in an endless path within said drum, a pressure door mounted on said drum for movement about a vertical axis, means for yieldably urging said pressure door into engagement with the plants so as to urge the plants towards the spindles with a predetermined substantially uniform pressure regardless of plant size, said pressure door being split horizontally to provide upper and lower door sections, an equalizer bar having its upper and lower extremities connected to the upper and lower sections of the pressure door, an actuating device, means connecting the actuating device to the equalizer bar to cause movement of the equalizer bar and the door sections connected thereto, and means for shifting the point of connection between said last named means and the equalizer bar.

14. In a mobile cotton picker, a picker drum, a plurality of moving spindles travelling in an endless path within said drum and adapted to engage the cotton plants as the picker is moved over the cotton plants, a pressure door mounted on said drum for movement toward and away from said spindles, and automatically operated means for yieldably urging the pressure door into engagement with the plants so as to urge the plants towards the spindles with a predetermined substantially uniform pressure regardless of plant size.

15. A cotton picker as in claim 14 wherein said pressure door is split to provide at least two separate sections and wherein the means for yieldably urging the pressure door into engagement with the plant includes an equalizer bar connected to the sections and urging the sections of the door into engagement with the plant.

16. In a cotton picker, a picker drum, a plurality of moving spindles travelling in an endless path within said drum, a pressure door mounted on said drum for movement about a vertical axis, said pressure door being split horizontally to provide top and bottom door sections, an equalizer bar having its upper and lower extremities pivotally connected to said top and bottom door sections, and actuating means including an actuating device connected to said equalizer bar, said actuating means also including means for applying relatively constant force to the equalizer bar so that both top and bottom sections of the door are urged towards the spindles with a substantially uniform pressure regardless of the size of the plant.

17. In a cotton picker, a vertically extending picker drum movable over the cotton plants, the picker drum having an entrance opening through which the cotton plants can pass, a plurality of moving spindles travelling in an endless path within the drum adjacent one side of the entrance opening, a pressure door mounted on said drum for movement about a vertical axis toward and away from the spindles, and automatically operated means for yieldably and continuously urging the pressure door into engagement with the cotton plants so as to urge the cotton plants towards the spindles with a predetermined substantially uniform pressure regardless of the plant size as the picker drum is moved over the cotton plants.

18. A cotton picker as in claim 17 wherein the door is split horizontally in at least two sections, and wherein said automatically operated means includes an actuating device for applying a continuous force, and means connecting the actuating device to the door sections so that the door sections are urged into engagement with the cotton plants substantially independent of each other.

19. In a cotton picker, a vertically extending picker drum movable over the cotton plants, the picker drum having an entrance opening through which the cotton plants can pass, a pressure door mounted in said drum for movement about a vertical axis and laterally of the direction of movement of the picker drum over the cotton plants, a shaft rotatably mounted in the picker drum, shoe means mounted on the shaft and engaging the pressure door, and automatically operated means including a fluid actuator for applying a substantially constant rotational force to the shaft to urge the shoe means carried by the shaft into engagement with the doors to thereby urge the cotton plants laterally with a substantially uniform pressure regardless of plant size as the picker drum is moved over the cotton plants.

20. A cotton picker as in claim 19 wherein the fluid actuator includes a reciprocating plunger, a lever arm pivotally connected to said plunger, and means connecting said lever arm to said shaft.

21. A cotton picker as in claim 20 wherein said means connecting said lever arm to said shaft includes means for permitting angular adjustment of said lever arm with respect to said shaft.

22. A cotton picker as in claim 19 wherein the shoe means includes at least one shoe member, the shoe member having an open, arcuate portion adapted to receive the shaft, and means for fixing said shoe member to the shaft.

23. A cotton picker as in claim 19 wherein said automatically operated means includes a source of hydraulic fluid, a pump connected to the source of hydraulic fluid, means connecting the output of the pump to the fluid actuator, said last named means including an adjustable relief valve for adjusting the pressure applied to the fluid actuator, and return means connecting the adjustable relief valve to the source of hydraulic fluid.

24. In a cotton picker, a picker drum, a plurality of moving spindles travelling in an endless path within said drum, a pressure door mounted in said drum for movement about a vertical axis, means for yieldably urging said pressure door laterally into engagement with the plants so as to urge the plants towards the spindles with a predetermined substantially uniform pressure regardless of plant size as the cotton picker moves over the plants, said means for yieldably urging the pressure door into engagement with the plants including a shaft rotatably mounted in the picker drum, shoe means secured to the shaft and engaging the pressure door, a fluid actuator, means connecting the fluid actuator to the shaft so that as the fluid actuator is operated said shaft is rotated, and means for supplying fluid under a constant pressure to said fluid actuator.

25. In a housing structure for a cotton harvester having a fore-and-aft extending plant receiving passage, the improvement comprising: upright wall structure adjacent to and defining at least a portion of one side of the passage composed of upper and lower vertically disposed fore-and-aft extending plates; means mounting the upper plate on the housing structure for lateral movement as respects the passage; and power means on the housing structure connected to the upper plate adjustable to effect positive lateral positioning of the latter relative to the passage.

26. In an automatic pressure door control for cotton pickers, a picker drum movable over the cotton plants, a plurality of moving spindles travelling in an endless path within said drum, a pressure door mounted in said drum for movement about a vertical axis toward and away from said spindles, said door being split horizontally to provide upper and lower door sections, and automatically operated means for yieldably and continuously urging said pressure door into engagement with the plants so as to urge the plants towards the spindles with a predetermined substantially uniform pressure regardless of plant size as the picker drum is moved over the cotton plants, said automatically operated means including means for applying a differential pressure to one of the door sections with respect to the other door section.

27. In a housing structure for a cotton harvester having a fore-and-aft extending plant receiving passage, the improvement comprising: upright wall structure adjacent to and defining at least a portion of one side of the passage composed of upper and lower vertically disposed fore-and-aft extending plates; means mounting the plates on the housing structure for lateral movement as respects the passage; means on the housing structure yieldably resisting outward movement of the plates relative to the passage; and power means on the housing structure connected to the upper plate adjustable to effect lateral positioning of the upper plate with respect to the plant receiving passage.

28. In a housing structure for a cotton harvester having a fore-and-aft extending plant receiving passage, the improvement comprising: upright wall structure adjacent to and defining at least portions of each side of the passage composed of upper and lower vertically disposed fore-and-aft extending plates; means mounting the plates on the housing structure for lateral movement as respects the passage; means on the housing structure yieldably resisting outward movements of the lower plates relative to the passage; and power means on the housing structure connected to the upper plates adjustable to effect lateral positioning of the upper plates relative to the plant receiving passage.

29. The invention defined in claim 28 in which the power means includes a hydraulic cylinder supported on the housing with means connecting it to the respective plates.

30. In a housing structure for a cotton harvester having a fore-and-aft extending plant receiving passage, the improvement comprising: upright wall structure adjacent to and defining at least a portion of the passage composed of vertically disposed fore-and-aft extending plates; means mounting the plates on the housing structure for lateral movement as respects the passage; means on the housing structure yieldably resisting the outward movements of the plates relative to the passage; and means exterior of the housing structure connected to at least one of the plates and adjustable to effect the lateral positioning of the latter relative to the passage.

31. In a housing structure for a cotton harvester having a fore-and-aft plant receiving passage, the improvement comprising upright wall structure adjacent to and defining at least a portion of the passage composed of vertically disposed fore-and-aft extending plates, means mounting the plates on the housing structure for lateral movement as respects to the passage, and hydraulically actuated means connected to at least one of the plates adjustable to effect lateral positioning of the latter relative to the passage.

32. In a housing structure for a cotton harvester having a fore-and-aft extending plant receiving passage, the improvement comprising: upright fore-and-aft disposed wall structure defining at least a portion of the passage side yieldably supported on the housing structure to move outwardly in respect to the passage, a rockable member on the housing structure; means behind the wall structure forming an operative relationship between the rockable member and the wall structure whereby rocking of the member will effect movement of the wall structure to vary the width of the passage; and a control device remote from the member for rocking the member.

33. In a housing structure for a cotton harvester having a fore-and-aft extending plant receiving passage, the improvement comprising: upright fore-and-aft disposed wall structure defining at least a portion of the passage side yieldably supported on the housing structure to move outwardly in respect to the passage, a movable member mounted on the housing structure; means behind the wall structure forming an operative relationship between the member and the wall structure whereby movement of the member will effect movement of the wall structure to vary the width of the passage; and a control device remote from the member for moving the member.

34. The invention defined in claim 33 in which the member is a rockable member supported on the housing structure behind the wall structure.

35. In a pressure door control for use with a cotton picker of the type having a picker drum with a fore-and-aft extending plant receiving passage and a vertically disposed pressure door defining at least a portion of one side of the passage for lateral movement with respect to the passage, power means, a mechanical linkage forming an operative relationship between said power means and said pressure door to effect lateral positioning of the pressure door relative to the passage upon operation of the power means, and manually operable control means connected to the power means for controlling the operation of said power means, said control means being adapted to be mounted on the cotton harvester at a point accessible to the operator of the cotton harvester while the cotton harvester is in operation.

36. Apparatus as in claim 35 wherein said pressure door is split horizontally to provide upper and lower sections and wherein said mechanical linkage includes means connecting said power means to the upper section.

37. Apparatus as in claim 36 wherein said mechanical means includes an equalizer bar connected to both the upper and lower door sections.

38. Apparatus as in claim 36 wherein said mechanical linkage includes a shaft, means connecting said shaft to said power means whereby as said power means is actuated said shaft is rotated, and means operable by movement of the shaft to effect lateral positioning of the pressure door.

39. Apparatus as in claim 38 wherein said means operable by the shaft includes shoes carried by the shaft and adapted to engage the pressure door.

40. In a cotton picker, a picker drum having a fore-and-aft plant receiving passage, upright wall structure adjacent to and defining at least a portion of one side of the passage, means mounting the upright wall structure on the picker drum for lateral movement with respect to the passage, power means, a mechanical linkage connected to the power means and forming an operative relationship with the upright wall structure to effect lateral positioning of the wall structure relative to the passage as the power means is operated, and manually operable control means connected to the power means and accessible to the operator of the cotton harvester while the cotton harvester is in operation for controlling the power means.

References Cited

UNITED STATES PATENTS

| 2,830,427 | 4/1958 | Odom | 56—44 |
|---|---|---|---|
| 3,103,092 | 9/1963 | Templeton | 56—44 |

ABRAHAM G. STONE, *Primary Examiner.*

RUSSELL R. KINSEY, *Examiner.*

M. C. PAYDEN, *Assistant Examiner.*